Aug. 28, 1962  R. HANSCHITZ  3,051,856
KITCHEN APPLIANCE WITH AIR COOLING SYSTEM THEREFOR
Filed Dec. 29, 1959  2 Sheets-Sheet 1
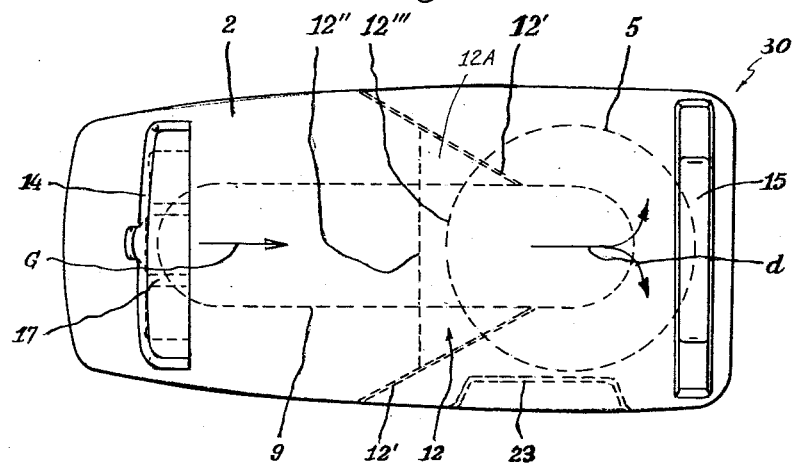
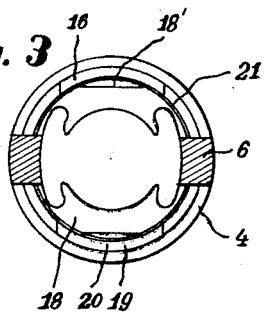
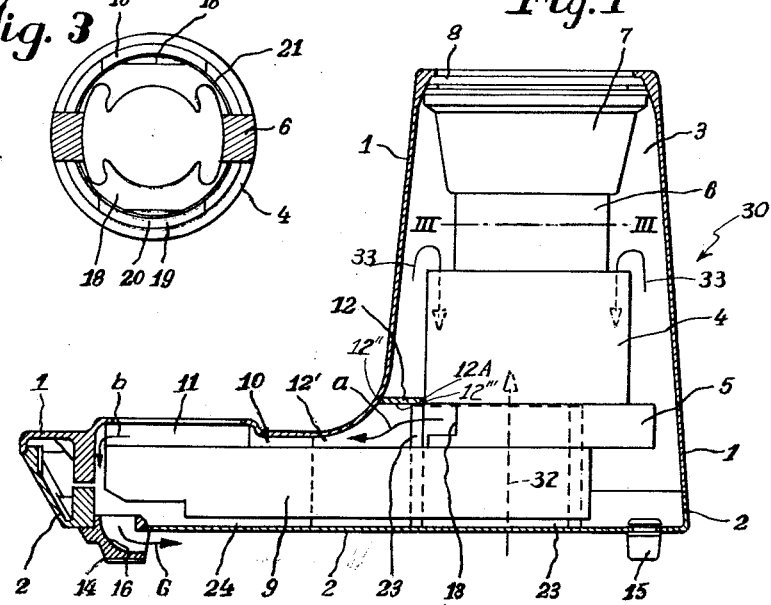
INVENTOR:
RUDOLPH HANSCHITZ

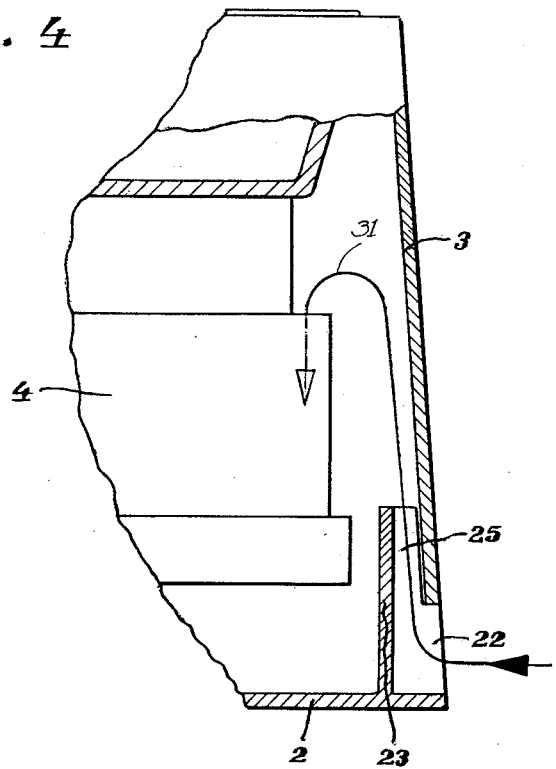

United States Patent Office 3,051,856
Patented Aug. 28, 1962

3,051,856
KITCHEN APPLIANCE WITH AIR COOLING
SYSTEM THEREFOR
Rudolf Hanschitz, Reichenbach (Fils), Germany, assignor to Electrostar G.m.b.H., Reichenbach (Fils), Germany
Filed Dec. 29, 1959, Ser. No. 862,656
Claims priority, application Germany May 9, 1959
15 Claims. (Cl. 310—59)

The present invention relates, in general, to a kitchen appliance of the food mixer or processing type and, in particular, to an air cooling system therefor.

In food processing machines, of the type to which the present invention relates, various different high speed food processing tools or attachments can be used on the machine to be operated by a motor driven shaft which is also with an air conveyor wheel to cool the motor. In said type of machine, provision is made for a housing or casing for the appliance which has both a vertical casing part and a horizontal casing part. The motor shaft is disposed in the vertical casing part and is connected by a reduction gear with an operating shaft disposed in the horizontal casing part. There is presented the problem of cooling not only the electric drive motor but also the reduction gear and the horrizontal part of the housing in which the reduction gear is disposed.

Therefore, it is an object of the present invention to provide means contributing to an effective cooling of the drive motor, as well as of the reduction gear and horizontal casing part, in an inexpensive and facile manner.

It is another object of the present invention to provide means affording cooling of the structural parts in the horizontal casing part to a high degree by suction air current flow and the cooling of the structural parts in the vertical casing part by pressure air current flow, or vice versa.

It is a further object of the present invention to provide means attaining efficacious guidance of the cooling air current flow in a practically noiseless manner.

These and other objects of the invention will become further apparent from the following detailed description, reference being made to the accompanying drawings, showing a preferred embodiment of the invention.

In the drawings which illustrate the best mode presently contemplated for carrying out the invention:

FIG. 1 is a side elevation view of a kitchen appliance pursuant to the present invention, in a more or less schematic representation, the casing being shown in a vertical central section;

FIG. 2 is a bottom somewhat schematic plan view of the appliance with parts being shown in broken line;

FIG. 3 shows the base of the motor, without armature and without windings, as seen from above along the section III—III in FIG. 1; and FIG. 4 is a fragmentary sectional view, on an enlarged scale, of the air supply system.

Briefly described, the present invention solves the previously stated prior art problem by dividing the entire housing of the kitchen machine for cooling the air flow current where the vertical part of the housing passes into the horizontal part of the housing, the structural parts in the horizontal part being cooled by suction and the structural parts in the vertical part being cooled by pressure currents. It is also within the scope of the present invention to make the suction current effective in the vertical part and the pressure current effective in the horizontal part. A special partition is provided to divide the interior of the housing. A lateral air outlet from the air supply chamber of the motor is associated with the horizontal part of the housing which is terminated by the partition.

The pressurized air current flow issues below, the reduction gear from the horizontal part of the housing and is deflected while issuing preferably into the horizontal part in such manner that it still passes under the machine housing from the exterior thereof. The housing is mounted resiliently on supporting legs or bars, one bar being provided for the air outlet and for the deflection of the air into the horizontal part. The opposite support bar divides the issuing air current in two directions.

Referring now to the drawings in detail, there is shown a kitchen appliance in the form of an electric food mixing or processing apparatus 30 of the type which, in addition to mixing, can be provided with attachments for juicing, cutting, shredding, etc. The machine housing or casing 1 has a bottom closure 2 which is secured thereto in conventional manner. The housing has a vertical part 3 in which there is mounted an electric drive motor 4.

A chamber defining means 5 is connected to the bottom of the motor. A conventional air blower or conveyor wheel (not illustrated) is mounted on the motor shaft and disposed in the chamber 5. A base stirrup 6 adjoins the schematically shown motor base at the top thereof, said stirrup mounting the upper bearing for the vertical motor shaft (not illustrated) which extends into a pot-shaped insert 7.

The insert 7 is conventional and serves to insert and couple a conventional food mixing container. The vertical housing part 3 is hermetically sealed at the top thereof by insert 7 and a packing ring 8.

Beneath the air conveyor chamber 5, the motor shaft engages the casing 9 of reduction gear means (not illustrated) which forms a structural unit with the motor. The horizontal gear case 9 extends into the horizontal housing part 10. A second joint for attaching and coupling a shower device is indicated at 11.

A partition 12 is disposed at the point of transition from the vertical housing part 3 to the horizontal housing part 10. Said partition comprises a specially shaped thin plate, preferably formed of pressed board, which is loosely inserted in the housing. Two wings 12' extend from the horizontal part 12A of partition 12. Said wings are bent angularly downwardly and abut the housing 1 on the inside, at the left (as shown in FIG. 2) and the gear case 9 laterally on the right, as shown therein. The horizontal part 12A of the partition has an end edge 12" which abuts the inner surface of housing 1.

An opposite circular limiting edge 12''' abuts the external surface of the air conveyor chamber 5 at the motor 4. The entire partition 12 forms a guide funnel for the pressurized air flow current issuing from chamber 5. Chamber 5 has a lateral air outlet 13 which opens into the funnel defined by the partition.

Support bars 14—15 are inserted into bottom member 2. Said bars are preferably formed of resilient material. Bar 14 has an angular channel 16 which extends over the entire width of case part 2. The channel can be subdivided with reinforcing ribs 17, as shown in FIG. 2. The continuous motor base 4—6 is provided with a compressed sheet metal package 18 (FIG. 3) which has lateral cut-outs 19, within which are arranged opposing portions 18' of package 18. In order to provide air supply channels 20 at this point, simple thin disks 21 of non-magnetic material, such as pressed board, are inserted into the motor base, said disks having a semicircular configuration (FIG. 3). These disk, which are T-shaped in development, extend above the laminated packing from one stirrup strap to the other. The central part of the disks 21 extend laterally downwardly of package 18 and closes cut-outs 19. In this manner, there are formed the air passage channels shown at 20 in FIG. 3. The disks 21, above the laminated package, complement the cylindrical exterior surface of the motor base and extend it in an upward direction. The two thin discs 21 are simply plugged or placed into the cutouts 19 to form the end channels 20 between the discs 21 and the portions 18' of the plate package 18.

A cut-out 22 is provided in the vertical edge of the bottom closure 2 and said closure is provided also, inwardly of said cut-out, with a vertical wall 23 which extends upwardly for a certain distance into the vertical case part 3. Wall 23, bent off twice in an angular direction, as seen in horizontal cross section, forms, with the wall of housing part 3, a vertical shaft or passageway 25 through which the air is drawn in by suction as shown by arrow 31 in FIG. 4.

With the motor in operation, air is sucked in through passageway 25, the air passing through the motor base and over the inserted disk 21 from the outside. Due to the suction effect of the air conveyor or blower wheel in chamber 5, the intake air is sucked into the motor, as shown by arrows 32—33 in FIG. 1. This intake air cools the motor armature and the laminated packing 18 from the inside thereof and also from the outside thereof through channels 20. The air issues through opening 13 in the direction of arrow $a$ in FIG. 1, from the chamber 5 and below partition 12, so that pressurized air only passes in the horizontal housing part 10. The air current passes over the gear case 9, at the top and at the sides thereof, flowing as shown by arrows $b$ and $c$. The air issuing from channel 16 in support bar 14 below the gear case 9, is horizontally deflected, as shown by arrow $c$, and flows under the bottom member 2.

A portion of the air issuing from channel 16 flows laterally out from under bottom member 2, the remainder of the air flows against the opposite support bar 15 and is divided by said bar, as shown by double arrows $d$ in FIG. 2, to be deflected downwardly in different directions.

The narrow space 24 between the gear case $g$ and the bottom member 2 can be separated, in the vicinity of wings 12' of partition member 12, by a rubber strip which is inserted during assembly of the apparatus. Similar strips can be inserted between the vertical and horizontal housing parts 3 and 10.

Various changes and modifications may be made without departing from the spirit and scope of the present invention and it is intended that such changes and modifications be embraced by the annexed claims.

Having thus described the invention, what is claimed as new and desired to be secured by Letters Patent is:

1. In an electrically operated food processing kitchen appliance having a housing provided with a vertical portion and a horizontal portion extending outwardly from said vertical portion and wherein a motor is mounted in the vertical portion and includes a motor shaft in the vertical portion mounting a blower wheel for cooling the appliance gear mechanism in the horizontal housing portion interconnecting an operating shaft in the horizontal housing portion with said motor shaft, the improvement comprising means provided at the transition of said housing portion for cooling one of said housing parts by suction air flow and the other of said housing parts by pressurized air flow, including a partition at the transition of said vertical and horizontal housing portions and lateral air outlet means in said chamber for directing air under said partition into said horizontal portion, the vertical portion being cooled by suction air flow and the horizontal portion being cooled by pressurized air flow, and air inlet means defined at the lower portion of said vertical portion having an upwardly directed passageway, and means to direct the incoming suction air over the exterior of the motor and then through the interior thereof to the blower wheel and along the horizontal portion.

2. A kitchen appliance as set forth in claim 1, wherein the motor is provided with internal air supply channels.

3. A kitchen appliance as set forth in claim 1, wherein provision is made to deflect the air issuing from the housing into a horizontal direction to flow under the housing.

4. A kitchen appliance as set forth in claim 3, wherein said air deflecting provision comprises a support bar provided with a deflecting channel.

5. A kitchen appliance as set forth in claim 3, wherein said air deflecting provision comprises a support bar provided with a deflecting channel, said support bar being formed of resilient material.

6. A kitchen appliance as set forth in claim 3, wherein said air deflecting provision comprises a support bar provided with a deflecting channel, said support bar being formed of resilient material, and a second support bar in opposition to said first support bar, said channel having an outlet directed at said second support bar.

7. A kitchen appliance as set forth in claim 1, wherein the partition has a loose connection with said housing.

8. A kitchen appliance as set forth in claim 1, wherein the partition has a loose connection with said housing, and downwardly bent angularly directed wings extending from said partition to abut the interior of said housing and a casing for said reduction gear.

9. A food processing kitchen appliance comprising a housing with a vertical portion and a horizontal portion extending outwardly from said vertical portion, gear means in said horizontal portion, a motor mounted in said vertical portion, a blower connected to said motor for rotation thereby, shaft means connecting said motor with said gear means, air inlet means defined in said housing adjacent the lower portion of said motor, air outlet means defined in said housing, and partition wall means in said housing disposed to direct incoming air upwardly in said housing vertical portion alongside said motor and then into said motor to said blower and outwardly in said horizontal portion along said gear means.

10. A food processing kitchen appliance according to claim 9, including a container insert formed at the upper end of said vertical portion.

11. A food processing kitchen appliance according to claim 9, including means on said horizontal portion for rotatably mounting food processing means above said gear means.

12. A food processing kitchen appliance according to claim 9, including means for directing air from said horizontal portion along the exterior bottom of said horizontal portion.

13. A food processing kitchen appliance according to claim 9, wherein said air outlet means includes a downwardly extending hollow support connected to said horizontal portion.

14. A food processing kitchen appliance comprising a housing with a vertical portion and a horizontal portion extending outwardly from the lower end of said vertical portion, gear means in said horizontal portion, a motor mounted in said vertical portion, a blower connected to said motor for rotation thereby, shaft means connecting said motor with said gear means, an inlet adjacent the lower portion of said vertical portion disposed to direct incoming air upwardly in said vertical portion, partition means in said housing for deflecting air upwardly in said vertical housing portion and then downwardly in said motor to said blower and outwardly in said horizontal portion along said gear means, and outlet means defined in the lower portion of said horizontal portion.

15. A food processing kitchen appliance according to claim 14, wherein said air outlet means includes a pedestal extending downwardly from said horizontal portion and having a passageway defined therein directing outlet air along the bottom of said housing, said gear means being located to permit some flow from the top of said gear means and out said outlet and some flow along the bottom of said gear means.

References Cited in the file of this patent

UNITED STATES PATENTS

| | | |
|---|---|---|
| 1,454,041 | Cramer | May 8, 1923 |
| 2,246,832 | Becker | June 24, 1941 |

FOREIGN PATENTS

| | | |
|---|---|---|
| 181,040 | Austria | Feb. 10, 1955 |